(12) United States Patent
Moon (10) Patent No.: US 10,612,686 B2
(45) Date of Patent: Apr. 7, 2020

(54) SAFETY FAUCET FOR HOT WATER

(71) Applicant: CLOVER CO., LTD., Anyang-si, Gyeonggido (KR)

(72) Inventor: Young Mu Moon, Gunpo-si (KR)

(73) Assignee: CLOVER CO., LTD., Anyang-si, Gyeonggido (KR)

( * ) Notice: Subject to any disclaimer, the term of this patent is extended or adjusted under 35 U.S.C. 154(b) by 0 days.

(21) Appl. No.: 16/097,270

(22) PCT Filed: May 9, 2016

(86) PCT No.: PCT/KR2016/004782
§ 371 (c)(1),
(2) Date: Oct. 28, 2018

(87) PCT Pub. No.: WO2017/188494
PCT Pub. Date: Feb. 11, 2017

(65) Prior Publication Data
US 2019/0113151 A1 Apr. 18, 2019

(30) Foreign Application Priority Data
Apr. 29, 2016 (KR) .................. 10-2016-0053388

(51) Int. Cl.
*B67D 3/00* (2006.01)
*F16K 35/02* (2006.01)
(Continued)

(52) U.S. Cl.
CPC .............. *F16K 35/02* (2013.01); *B67D 3/00* (2013.01); *B67D 3/04* (2013.01); *F16K 1/32* (2013.01); *F16K 1/34* (2013.01); *F16K 21/04* (2013.01)

(58) Field of Classification Search
CPC . B67D 3/00; B67D 3/04; B67D 3/043; B67D 3/045; B67D 3/0058; B67D 1/1466;
(Continued)

(56) References Cited

U.S. PATENT DOCUMENTS 1,797,282 A * 3/1931 Bentley .................. F16K 31/602
251/104
2,305,438 A * 12/1942 Michaels .......... F16K 31/52408
137/385
(Continued)

FOREIGN PATENT DOCUMENTS

KR 10-0588600 B1 6/2006
KR 10-0889807 B1 3/2009
(Continued)

OTHER PUBLICATIONS

International Search Report for PCT/KR2016/004782 dated Dec. 22, 2016 from Korean Intellectual Property Office.

*Primary Examiner* — Charles Cheyney
(74) *Attorney, Agent, or Firm* — Revolution IP, PLLC (57) ABSTRACT

A safety faucet includes: a discharge pipe which has a hot water discharge path formed therein; a packing which moves up and down inside the discharge pipe; an operation shaft which is fixed to the packing; an upper cap which covers an upper opening of the discharge pipe, and has an upper cap through-hole formed in a center thereof to expose an upper end of the operation shaft; a lever which is rotatably coupled to the upper end of the operation shaft, and has an auxiliary operation hinge hole formed in an upper end thereof; and a safety member from which an auxiliary operation hinge shaft inserted into the auxiliary operation hinge hole is protruded, and has a cap contacting part formed in a lower end thereof to meet with an upper surface of the upper cap to form a support point.

2 Claims, 13 Drawing Sheets

(51) Int. Cl.
*B67D 3/04* (2006.01)
*F16K 21/04* (2006.01)
*F16K 1/34* (2006.01)
*F16K 1/32* (2006.01)

(58) Field of Classification Search
CPC ...... F16K 35/025; F16K 41/103; F16K 35/02; F16K 21/04; F16K 1/34
USPC .................................. 222/509, 518, 559, 544
See application file for complete search history.

(56) References Cited

U.S. PATENT DOCUMENTS

| | | | | |
|---|---|---|---|---|
| 5,449,144 | A * | 9/1995 | Kowalics | B67D 1/125 251/104 |
| 5,470,044 | A * | 11/1995 | Chi | B67D 3/043 222/153.1 |
| 5,788,840 | A * | 8/1998 | Lee | B67D 3/0025 210/435 |
| 5,811,001 | A * | 9/1998 | Chang | B67D 3/04 210/238 |
| 6,793,195 | B2 * | 9/2004 | Dou | F16K 31/52408 251/110 |
| 6,880,797 | B2 * | 4/2005 | Yui | F16K 31/52 251/103 |
| 9,422,145 | B2 * | 8/2016 | Wang | F16K 35/025 |

FOREIGN PATENT DOCUMENTS

| | | |
|---|---|---|
| KR | 20-2009-0003551 U | 4/2009 |
| KR | 10-1120358 B1 | 3/2012 |
| KR | 10-1303923 B1 | 9/2013 |

* cited by examiner

SAFETY FAUCET FOR HOT WATER

TECHNICAL FIELD

The present invention relates to a safety faucet for hot water, and more particularly, a safety faucet for hot water enabling a lever to operate only at a time desired by a user by enabling a cap contacting part on the lower end of a safety member to move up and down, thereby being positioned below or above the upper surface of an upper cap when the lever rotates while forming a support point with respect to the upper surface of the upper cap.

BACKGROUND ART

A hot water outlet of a cold/warm water purifier or a cold and hot water dispenser is provided with a safety device to prevent scald due to discharge of hot water.

Generally, a method in which hot water is discharged only when user presses a lever for hot water discharge while pressing a safety member such as a button or a rotating member is employed. The safety member can adjust the discharge of hot water by changing a position of a support point for serving as a prize when pressing the lever.

Figure 1:
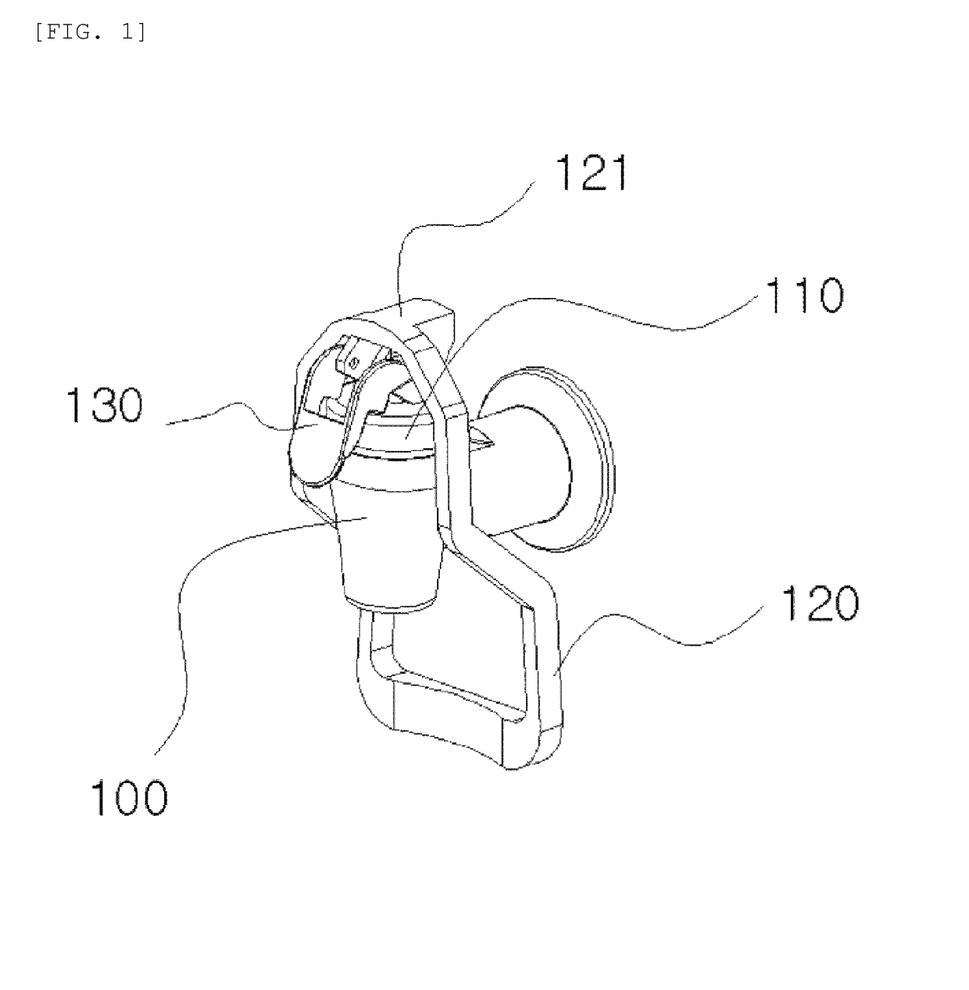
FIG. 1 is a perspective view illustrating a structure of a safety faucet according to a related art.
Figure 2:
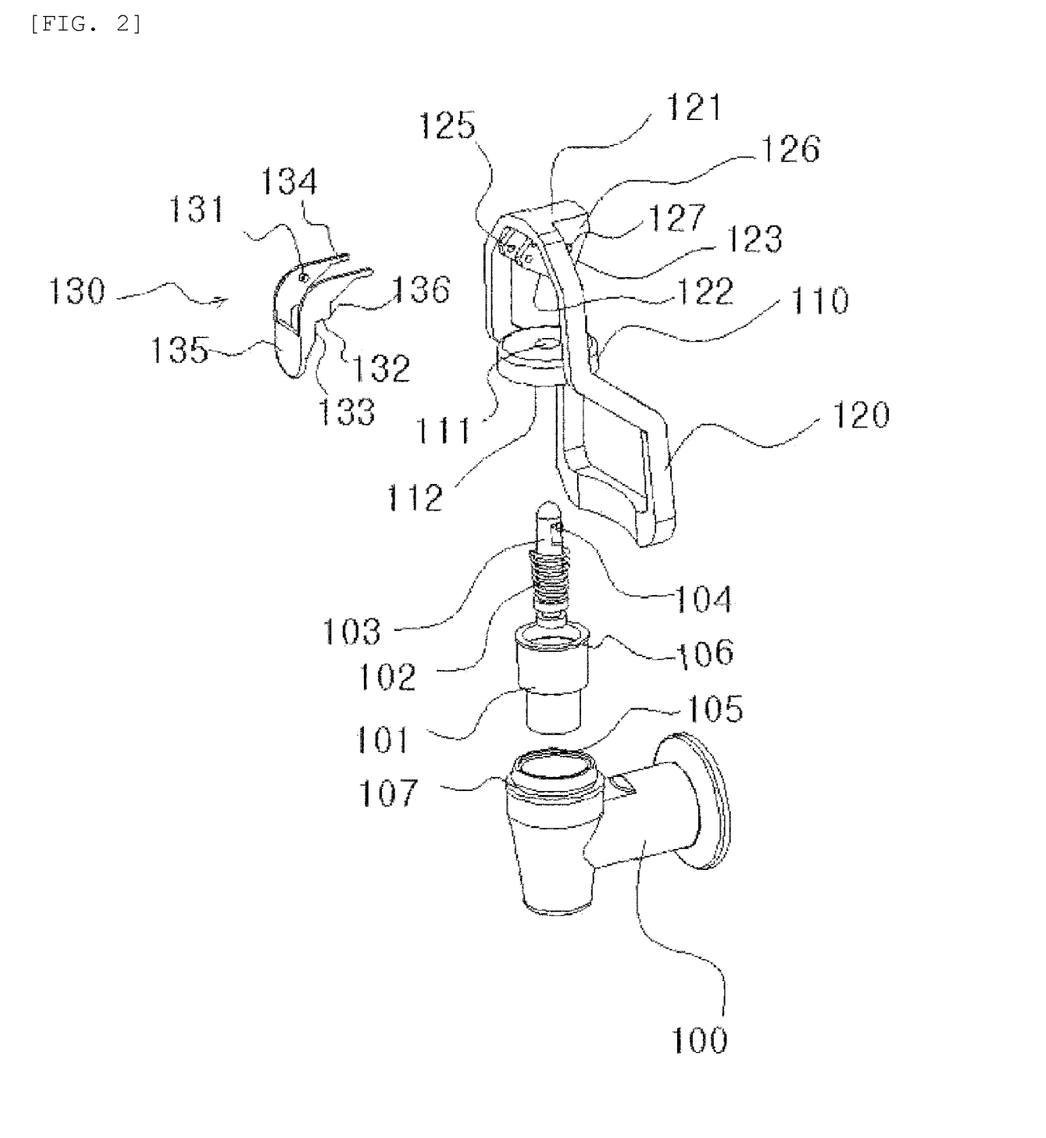
FIG. 2 is an exploded perspective view of the safety faucet shown in FIG. 1.
Figure 3:
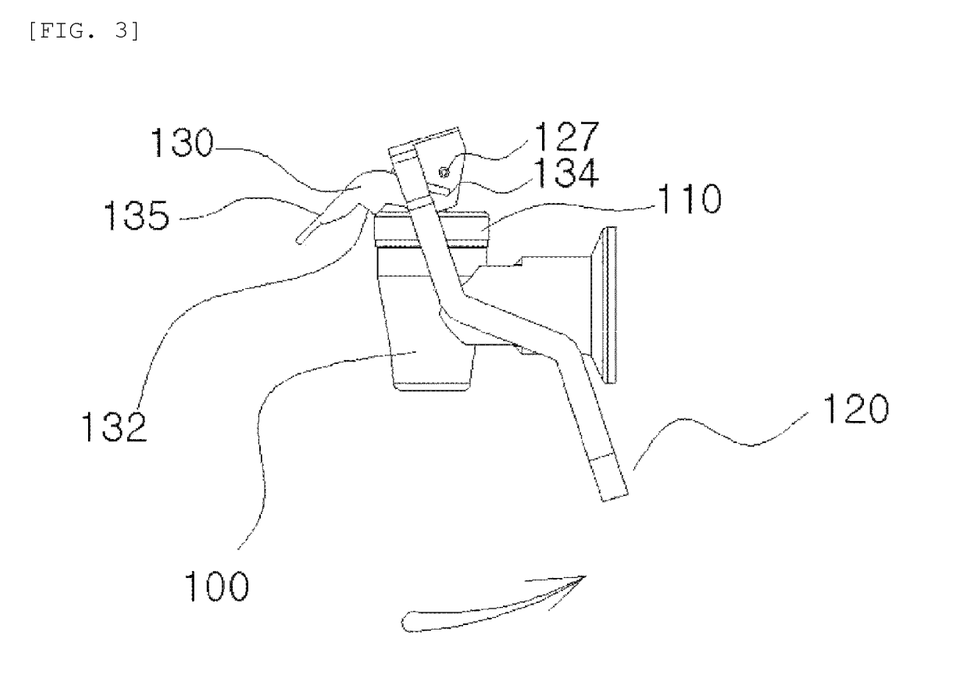
FIG. 3 is a side view showing operation when a lever is pressed without pressing a safety member.
Figure 4:
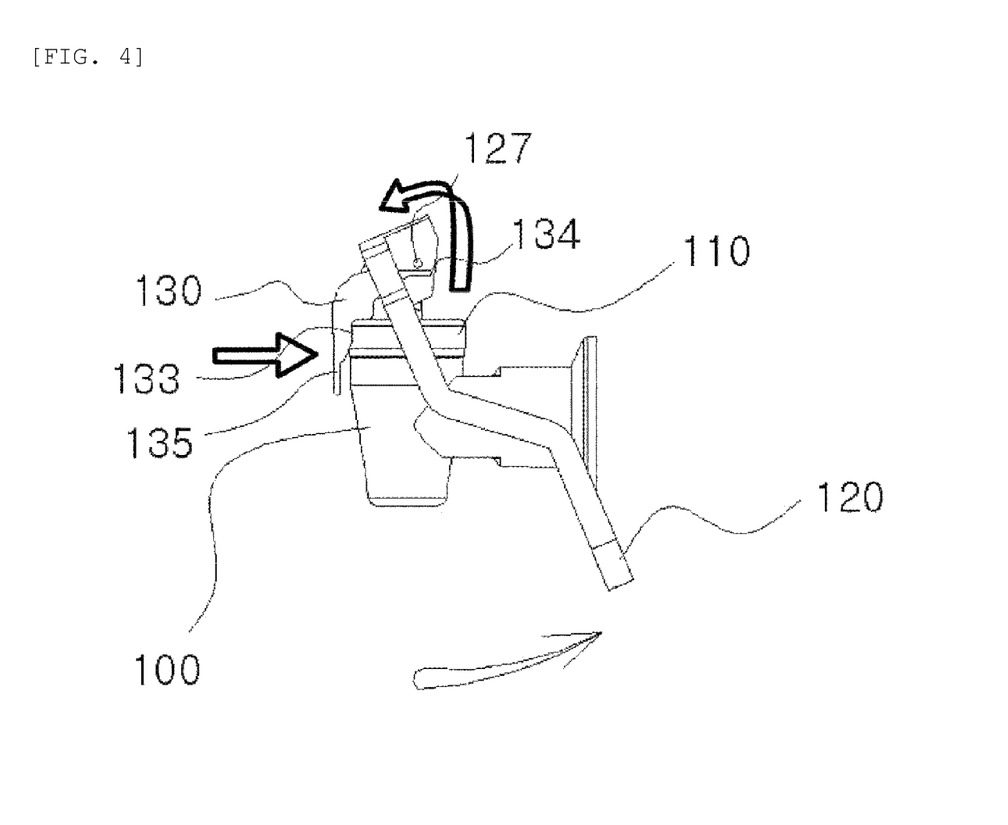
FIG. 4 is a side view showing operation when a lever is pressed while pressing a safety member.

FIG. 1 is a perspective view showing a structure of a safety faucet according to a related art, FIG. 2 is an exploded perspective view showing a configuration of the safety faucet of FIG. 1, FIG. 3 is a side view showing an operation when a lever is pressed without pressing the safety member, and FIG. 4 is a side view showing an operation when a lever is pressed while pressing a safety member.

A horizontal direction lever type cock includes a cock body 100, an upper cap 110, and a discharge lever 120.

A packing 101 for opening and closing a discharge port while being operated in the vertical direction on an internal pipeline, a packing rod 103 for operating the packing 101, and a spring 102 which is fitted in the packing rod 103 and exerts a compression force on the packing 101 to seal the discharge port are inserted and installed in the cock body 100.

The upper cap 110 seals the upper portion of the cock body 100, and a central hole 111 is formed at a center thereof to allow the packing rod 103 to project and operate.

In the discharge lever 102, a main operation hinge shaft 124 provided inside an upper lever head 121 is connected to an upper main operation hinge latch groove 104 of the packing rod 103, and a discharge lever 120 extending downward toward the lower side of the lever head 121 is applied with pressure in the horizontal direction so that the packing 101 intermits the discharge of water while vertically operating.

That is, when the lever head 121 rotates around a separate fulcrum in a state in which the main operation hinge latch groove 104 of the packing rod 103 is fitted in the main operation hinge shaft 124 formed in the inner side of the lever head 121, so that the packing rod 103 is lifted together with the packing 101 to be opened and closed.

The characteristic configuration of the related art is that the front and rear lower edges of the lever head 121 form a front cutting part 122 and a rear cutting part 123 which are obliquely cut so that the fulcrum of the lever cannot be formed, such that the fulcrum is not formed.

Instead of not forming the fulcrum as described above, a separate safety member 130 is additionally provided.

In the safety member 130, an auxiliary operation hinge shaft 131 is fitted and rotatably coupled to an auxiliary operation hinge hole 125 provided in an upper front side of the lever head 121 to form or release the fulcrum of the discharge lever 120, and the fulcrum is released by itself to have a locking function simultaneously with the withdrawal after the withdrawal operation of the discharge lever 120.

However, since the auxiliary operation hinge hole 125 is circular even in the safety faucet having such a structure, there is a problem that hot water is discharged while the safety member 130 forms a support point along with the upper surface of the upper cap 110 even when only the discharge lever 120 is pressed due to the frictional force between the safety member 130 and the upper cap 110.

In addition, although water is not discharged in a normal state due to the presence of the rear cutting part 123 of the lever head 121, when the discharge lever 120 is excessively pulled forward, the rear surface of the lever head 121 comes into contact with the upper cap 110, and thus there is a problem that hot water is discharged.

In addition, since the shape of the rear surface of the lever head 121 on the upper cap 110 forms a vertical surface, a horizontal surface, or an inverted triangular shape with respect to the upper surface of the upper cap 110, even when the safety member 130 is operated and the rear portion of the lever head 121 above the upper cap 110 is rotated forward or even when the lever head 121 is lifted up without operating the safety member 130, there is a problem that hot water is discharged.

DISCLOSURE

Technical Problem

It is an object of the present invention to provide a safety faucet for hot water which allows an auxiliary operation hinge shaft, which is a center of rotation of a safety member, is rotated inside an auxiliary operation hinge hole formed in a longitudinal direction, and allows a safety member to move up and down along the auxiliary operation hinge hole according to the operation of pressing the safety member by user so that the cap contacting part in the lower end of the safety member moves upward from below the upper surface of the upper cap to form a support point.

Technical Solution

In order to solve the above-described problems, there is provided a safety faucet for hot water which is provided in a hot water discharge side to selectively close or open a hot water discharge path, the safety faucet including: a discharge pipe 202 which has a hot water discharge path formed therein; a packing 206 which moves up and down inside the discharge pipe 202 to close or open the hot water discharge path; an operation shaft 208 which is fixed to the packing 206; an upper cap 216 which covers an upper opening of the discharge pipe 202, and has an upper cap through-hole 216a formed in a center thereof to expose an upper end of the operation shaft 208; a lever 218 which is rotatably coupled to the upper end of the operation shaft 208, and has an auxiliary operation hinge hole 218a formed in an upper end thereof; and a safety member 220 from which an auxiliary operation hinge shaft 220a inserted into the auxiliary operation hinge hole 218a is protruded, and has a cap contacting part 220b formed in a lower end thereof to meet with an upper surface of the upper cap 216 to form a support point, wherein the auxiliary operation hinge shaft 218a is provided with a vertical space in which the auxiliary operation hinge shaft 220a inserted therein is vertically moved, wherein the cap contacting part 220b is positioned below a virtual plane extending the upper surface of the upper cap 216 when the auxiliary operation hinge shaft 220a is positioned in a lowermost position of the auxiliary operation hinge hole 218a, and the cap contacting part 220b is positioned above the virtual plane extending the upper surface of the upper cap 216 when the auxiliary operation hinge shaft 220a is positioned in an uppermost position of the auxiliary operation hinge hole 218a.

A lever head of the lever 218 to which the operation shaft 208 is coupled has an inclined shape in a direction away from the operation shaft 208 while descending downward.

A locking jaw 220c protrudes from left and right sides of the safety member 220, the safety member 220 rotates around the auxiliary operation hinge shaft 220a when the safety member 220 is pushed so that the locking jaw 220c is in contact with an upper end of the lever 218, and when the lever 218 is pressed while the safety member 220 is pressed, a shaft line connecting the auxiliary operation hinge shaft 220a and the cap contacting part 220b is inclined outward in comparison with a vertical line extending vertically to the upper surface of the upper cap 216, then is identical with the vertical line, and then becomes a state of being inclined more inward than the vertical line.

Advantageous Effects

According to the present invention, the safety member does not form a support point with the upper surface of the upper cap, even when the lever is excessively pushed or pulled, and thus the present invention has the effect of preventing an accident where hot water is unintentionally discharged.

MODE FOR INVENTION

Hereinafter, a "safety faucet for hot water" (hereinafter, referred to as a "safety faucet") according to an embodiment of the present invention will be described with reference to the drawings.

Figure 5:
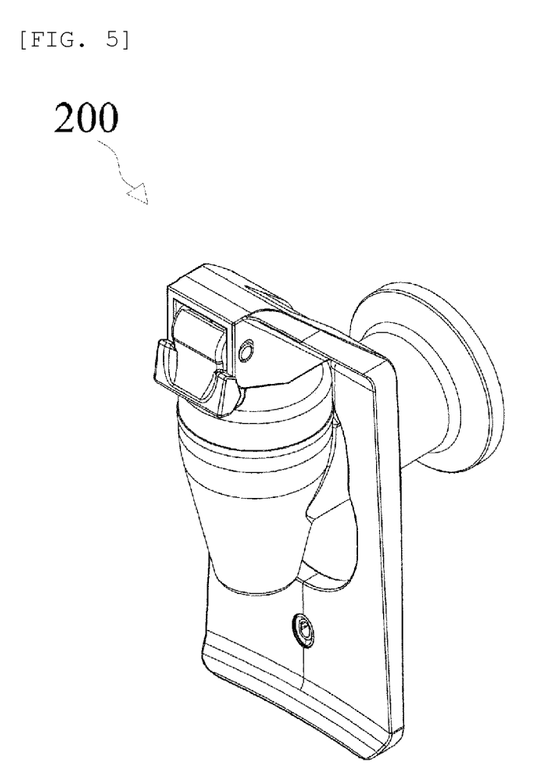
FIG. 5 is a perspective view illustrating a structure of a safety faucet according to an embodiment of the present invention.
Figure 6:
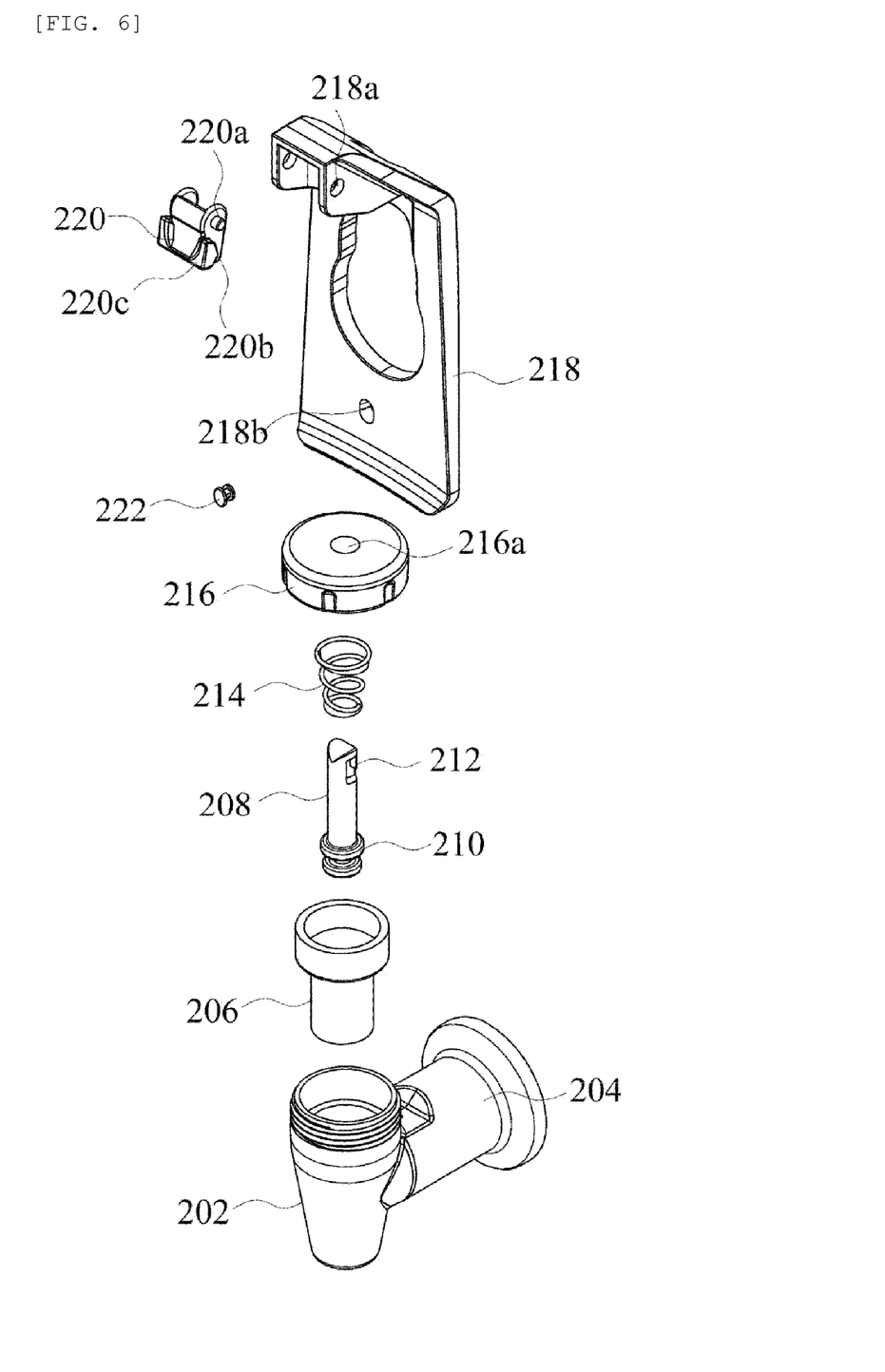
FIG. 6 is an exploded perspective view showing a configuration of the safety faucet of FIG. 5.
Figure 7:
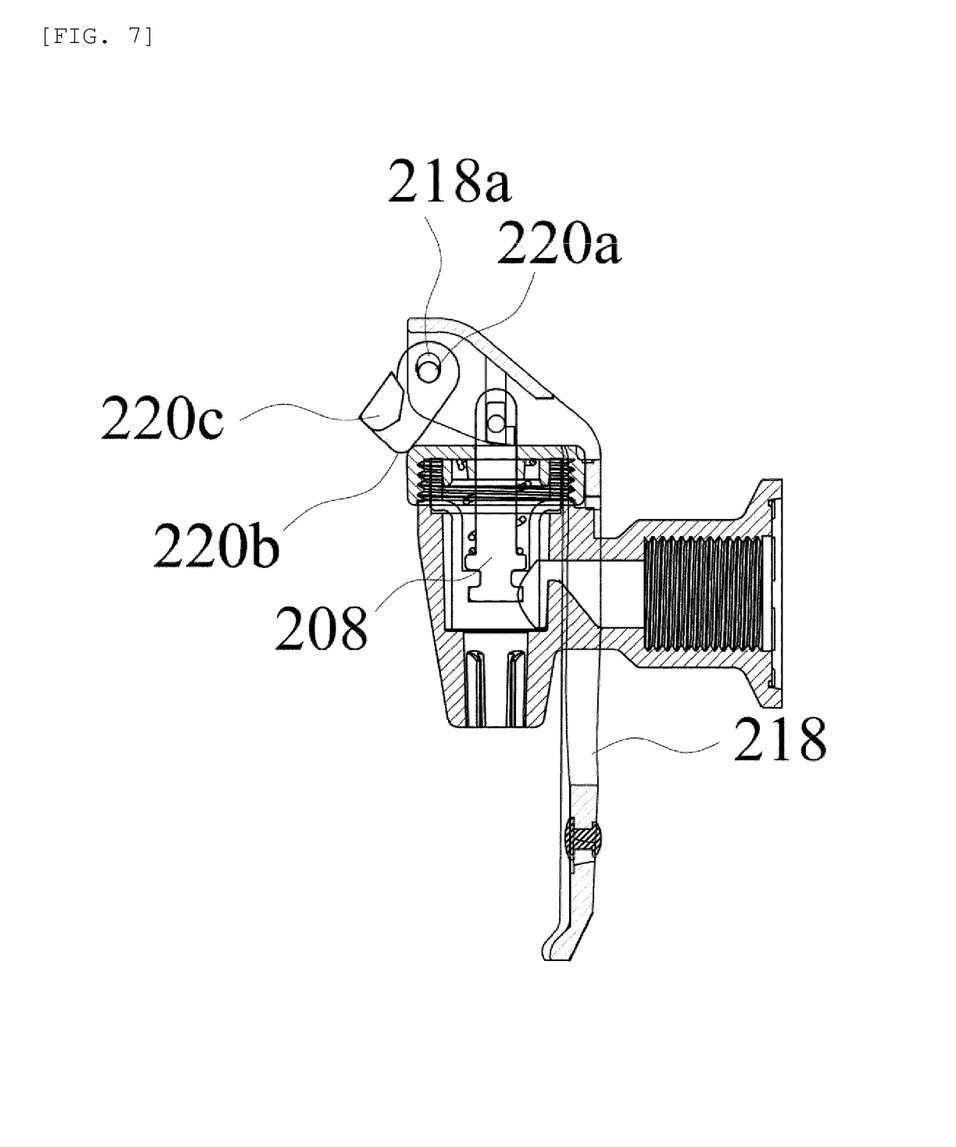
FIG. 7 is a cross-sectional view showing an internal coupling structure of a safety faucet.
Figure 8:
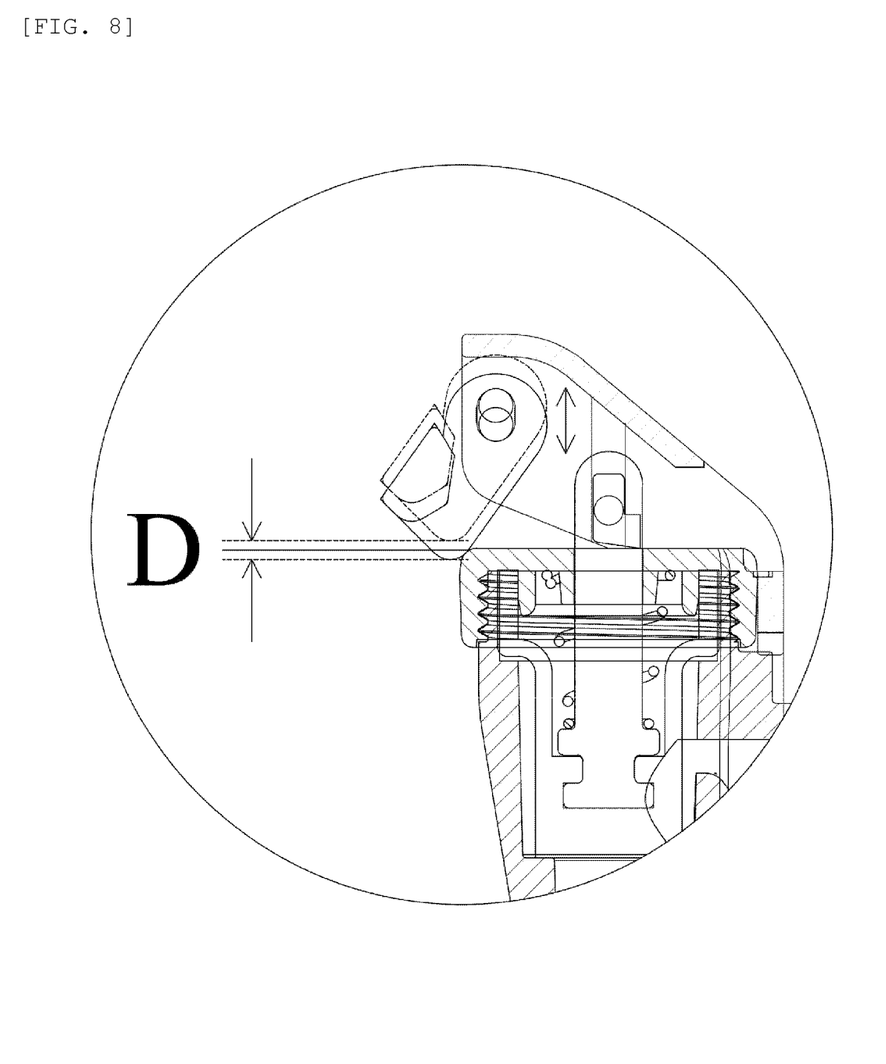
FIG. 8 is a cross-sectional view showing a state in which a safety member moves up and down.

FIG. 5 is a perspective view illustrating a structure of a safety faucet according to an embodiment of the present invention. FIG. 6 is an exploded perspective view showing a configuration of the safety faucet of FIG. 5. FIG. 7 is a cross-sectional view showing an internal coupling structure of a safety faucet. FIG. 8 is a cross-sectional view showing a state in which a safety member is moved up and down.

A safety faucet 200 according to the present invention is installed in a hot water discharge side of a cold and hot water dispensers or a cold/warm water purifier, and has a structure in which a hot water discharge path is opened to discharge hot water only when user presses a lever 218 while pressing a safety member 220.

In general, a discharge pipe 202 through which the hot water is discharged has a cylindrical shape in a vertical direction, and a packing 206 is inserted therein. The packing 206 serves to block or open the hot water discharge path between a hot water induction pipe 204 and a discharge pipe 202.

The packing 206 is moved up and down by the operation of the lever 218, and the packing 206 moves up and down together with an operation shaft 208 inserted inside the discharge pipe 202. The lower end of the operation shaft 208 is inserted into the packing 206. At the lower end of the operation shaft 208, a packing engaging part 210 is protruded and tightly fixed in the packing 206.

In the upper end of the operation shaft 208, an insertion groove 212 having a certain depth is formed in left and right sides. A protrusion (not shown) formed in a head portion of the lever 218 is inserted into the insertion groove 212. Two protrusions protruding in the middle direction from the inside of the head portion of the lever 218 are coupled to the insertion groove 212 formed in the upper end of the operation shaft 208 while being fitted to the insertion groove 212 from the left and right sides. Thus, when the lever 218 is pushed or pulled, the operation shaft 208 can be moved up and down by leverage.

The spring 214 is installed between an upper cap 216 and the packing 206 while covering the operation shaft 208. The elastic force of the spring 214 pushes the packing 206 in the opposite direction of the upper cap 216 to block the discharge pipe 202.

The upper cap 216 is a means for blocking the upper opening of the discharge pipe 202, and allows the upper end of the operation shaft 208 to be exposed to the outside through an upper cap through-hole 216a formed in the center. The upper end of the operation shaft 208 exposed to the outside of the upper cap 216 is rotatably coupled with the lever 218.

The lever 218 is, as used in a conventional faucet, composed of a pressing part in a lower end thereof and a lever head in an upper end thereof, and the safety member 220 is rotatably coupled to the lever head. A user presses the pressing part so that the operation shaft 208 is raised to the upper end due to leverage, and the packing 206 opens the discharge pipe 202 to allow hot water to pass. The lever head coupled with the operation shaft 208 is formed to be inclined downward while progressing to the rear side (a place to which the safety member 220 is coupled is the front side). Thus, the lower portion of the lever head becomes further away from the operation shaft 208.

A lever through hole 218b is formed in the pressing part in the lower end of the lever 218. A friction member 222 for increasing frictional force is fitted to the lever through hole 218b. The friction member 222 is provided to protrude slightly from the surface of the lever 218 so that when the user presses the lever 218 by hand, the frictional force is increased to prevent the hand from slipping.

The safety member 220 is coupled in such a manner that an auxiliary operation hinge shaft 220a protruding laterally is inserted into an auxiliary operation hinge hole 218ba formed in the left and right sides of the upper end of the lever 218. Since the auxiliary operation hinge shaft 220a freely rotates inside the auxiliary operation hinge hole 218a, the safety member 220 is freely rotatable with respect to the lever 218.

A cap contacting part 220b is formed in the lower end of the safety member 220. The cap contacting part 220b is a portion in contact with the upper surface of the upper cap 216, and the cap contacting part 220b and the upper surface of the upper cap 216 become a support point for leverage, so that the lever 218 can pull up the operation shaft 208.

A locking jaw 220c protrudes from the right and left side surfaces of the safety member 220. In the present invention, it is shown that the locking jaw 220c is protruded in both the left and right directions, but it may be formed in only one direction.

Figure 10:
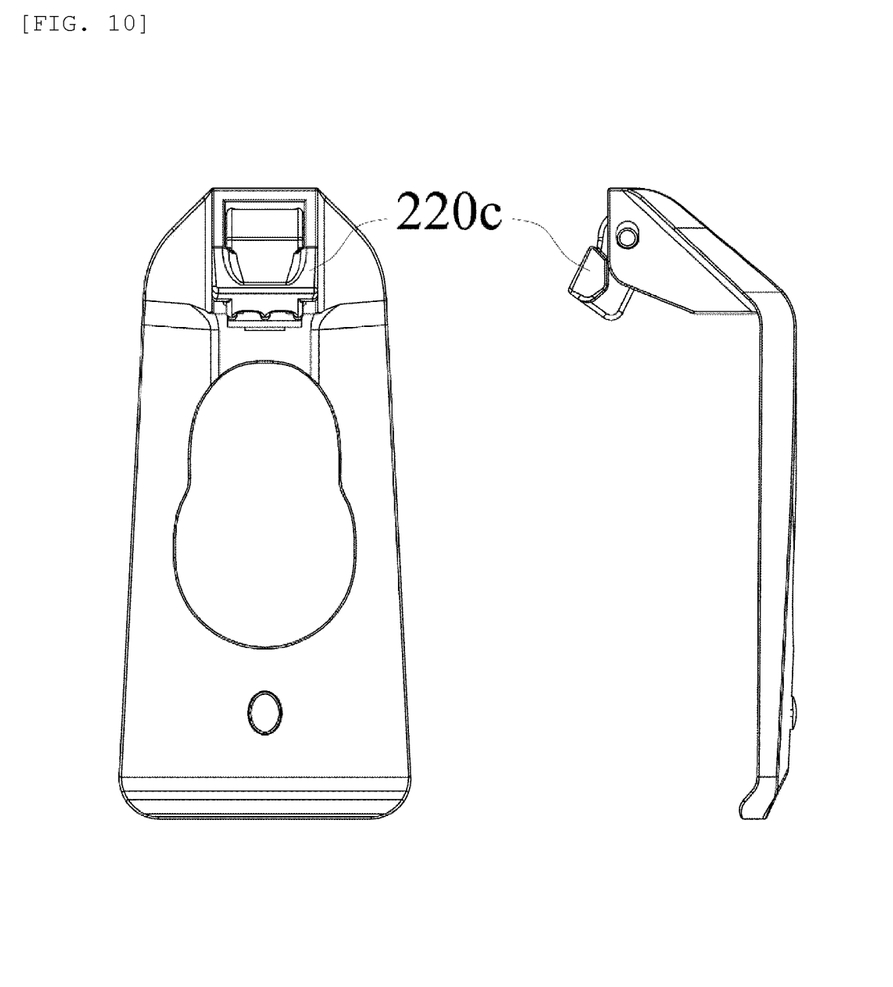
FIG. 10 is a view showing a state in which a locking jaw of safety member is in contact with a lever.

The width of the locking jaw 220c is wider than the upper end of the lever 218. Therefore, when the user presses the safety member 220 by hand, the locking jaw 220c interferes with the upper end of the lever 218, and is inserted only to a certain depth. If the safety member 220 can enter the inside of the body of the lever 218, the user may press the safety member 220 so that the safety member 220 can be inserted into the head of the lever 218. In this state, hot water may be discharged by only pressing the lever 218. In order to prevent such an accident, the locking jaw 220c is formed to be protruded.

The auxiliary operation hinge hole 218a into which the auxiliary operation hinge shaft 220a is inserted is formed to be longer in the up-and-down direction than in the left-to-right direction. The auxiliary operation hinge holes 218a may be an oval elongated in the longitudinal direction, a rectangular shape, or a complex shape. The left and right width of the auxiliary operation hinge shaft 218a is equal to or slightly larger than the diameter of the auxiliary operation hinge shaft 220a so that the auxiliary operation hinge shaft 220a can freely rotate without interference. In addition, the vertical length is much larger than the diameter of the auxiliary operation hinge shaft 220a, thereby securing a space in which the auxiliary operation hinge shaft 220a can freely move in the up and down direction. The length of the auxiliary operation hinge hole 218a in the up and down direction may vary depending on the size of the safety member 220, the position of the lever 218, the distance to the upper cap 216, and the like.

Based on such a structure, when no force is applied to the safety member 220, the auxiliary operation hinge shaft 220a is located in the lowermost of the auxiliary operation hinge hole 218a due to gravity. That is, the safety member 220 comes down to the lowermost position (see FIG. 7).

Preferably, the cap contacting part 220b is located below the virtual plane extending the upper surface of the upper cap 216.

When the safety member 220 is pushed or pulled up, the auxiliary operation hinge shaft 220a moves upward from the inside of the auxiliary operation hinge hole 218a so that when the auxiliary operation hinge shaft 220a reaches the uppermost position, the position of safety member 220 also becomes the highest state. Preferably, at this time, the cap contacting part 220b is positioned above the virtual plane extending the upper surface of the upper cap 216.

As shown in FIG. 8, the safety member 220 moves up and down along a vertical length of the auxiliary operation hinge hole 218a, and the vertical moving distance of the safety member 220 is indicated by D. Usually, the distance D in which the safety member 220 moves is equal to a length obtained by subtracting the diameter of the auxiliary operation hinge shaft 220a from the vertical length of the auxiliary operation hinge hole 218a.

As shown in FIG. 7, when the lower end of the safety member 220 is lower than the upper surface of the upper cap 216, the cap contacting part 220b can not contact the upper surface of the upper cap 216 even if the lever 218 is excessively pushed or pulled. Therefore, the frictional force with respect to the upper cap 216 can not be applied, so that the safety member 220 can not stay on the upper surface of the upper cap 216, and thus, the support point of the lever can not be formed. This prevents unintended hot water discharge.

Figure 9:
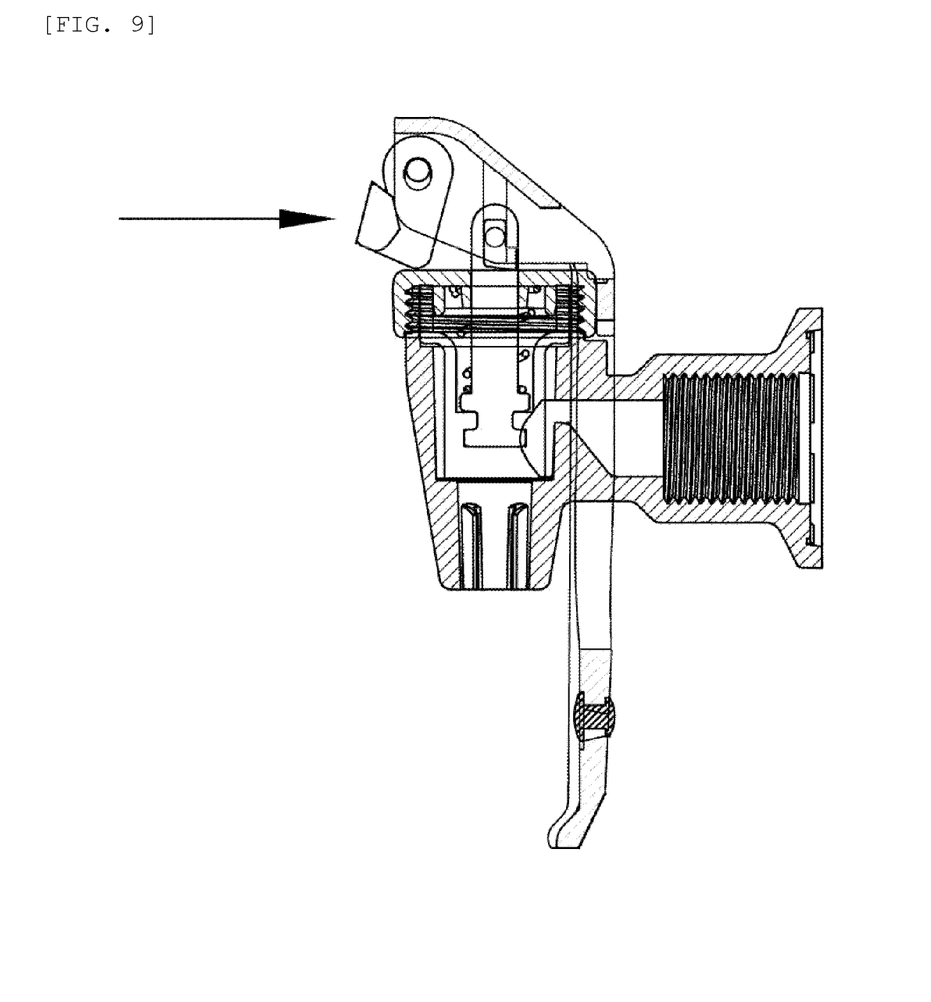
FIG. 9 is a cross-sectional view showing operation when a safety member is pressed.
Figure 11:
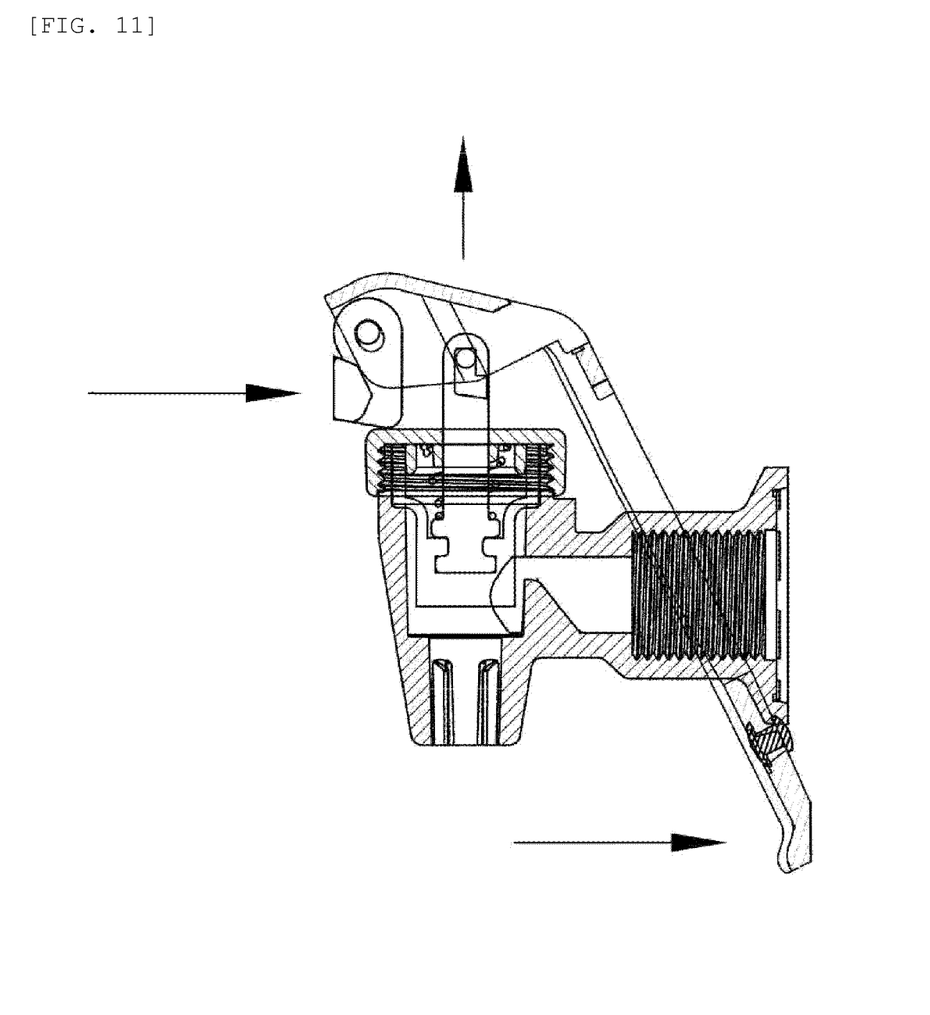
FIG. 11 is a cross-sectional view showing a method of pressing a safety member and a lever.
Figure 12:
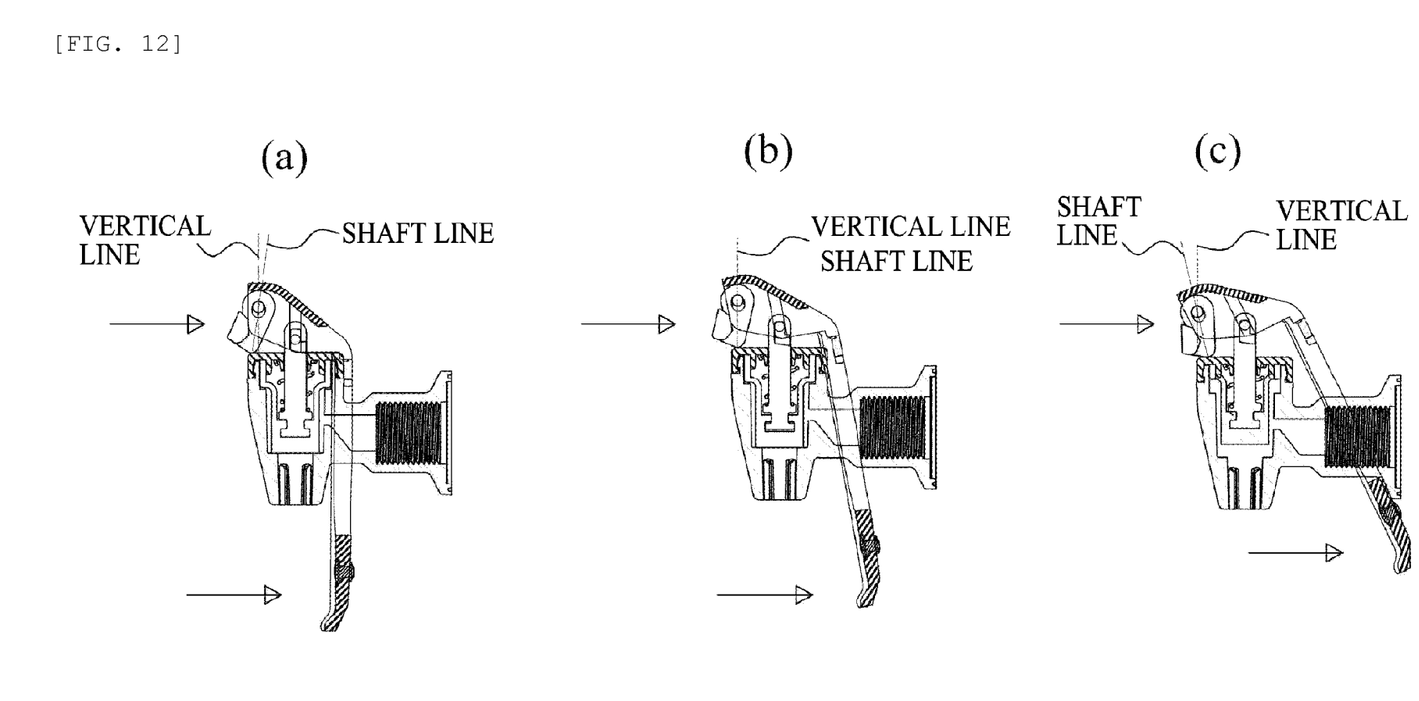
FIG. 12 is a cross-sectional view sequentially showing an angle change state of a safety member when a lever is pressed while the safety member is continuously pressed.

FIG. 9 is a cross-sectional view showing operation when a safety member is pressed. FIG. 10 is a view showing a state in which a locking jaw of safety member is in contact with a lever. FIG. 11 is a cross-sectional view showing a method of pressing a safety member and a lever. FIG. 12 is a cross-sectional view sequentially showing an angle change state of a safety member when a lever is pressed while the safety member is continuously pressed.

When user rotates the safety member 220 by a certain angle, the cap contacting part 220b enters into a space in contact with the upper surface of the upper cap 216. Since the safety member 220 is restricted by the locking jaw 220c, the safety member 220 is allowed to reach only a certain depth.

When the user pushes the lever 218 inward in this state (the state in which the safety member is pressed), as shown in FIG. 11, the safety member 220 closely contacts with the upper surface of the upper cap 216 to form a support point.

When the lever 218 is continuously pressed while the safety member 220 is being pressed, the safety member 220 can not slide on the upper surface of the upper cap 216, and the support point gradually moves toward the operation shaft 208.

In this state, a virtual line (referred to as a "shaft line" in FIG. 12) connecting the auxiliary operation hinge shaft 220a and the cap contacting part 220b, and a line extending perpendicularly to the upper surface of the upper cap 216 (referred to as a "vertical line" in FIG. 12) are assumed. As shown in the order of a-b-c in FIG. 12, initially, the vertical line and the shaft line are opened at a certain angle. Usually, the shaft line is inclined outward in comparison with the vertical line (FIG. 12a).

When the lever 218 is further pressed in this state, the safety member 220 rotates inward and passes through a point where the shaft line and the vertical line coincide (FIG. 12b)

When the lever 218 is continuously depressed, the shaft line of the safety member 220 is more inclined inward (FIG. 12C). That is, when descending from the auxiliary operation hinge shaft 220a along the shaft line to the cap contacting part 220b, it is inclined in a direction of approaching the center of the upper surface of the upper cap 216. Accordingly, as the lever 218 is pressed deeply, the safety member 220 is more strongly pressed. In this state, even if the hand pressing the safety member 220 is released, the safety member 220 does not separate from the upper surface of the upper cap 216.

Then, when the lever 218 is pushed, the lever 218 rotates while progressing upward based on the support point (cap contacting part). This allows the operation shaft 208 and the packing 206 to move upward, and allows the discharge pipe 202 to be opened.

As shown in FIG. 12C, since an externally directed force does not applied to the safety member 220 in a state in which the shaft line is inclined inward in comparison with the vertical line, even when the hand is released from the safety member 220, the operation shaft 208 does not descend, but maintains its position.

When the user removes the force pressing the lever 218, the elastic force of the spring 214 allows the operation shaft 208 to descend and allows the packing 206 to block the discharge pipe.

Figure 13:
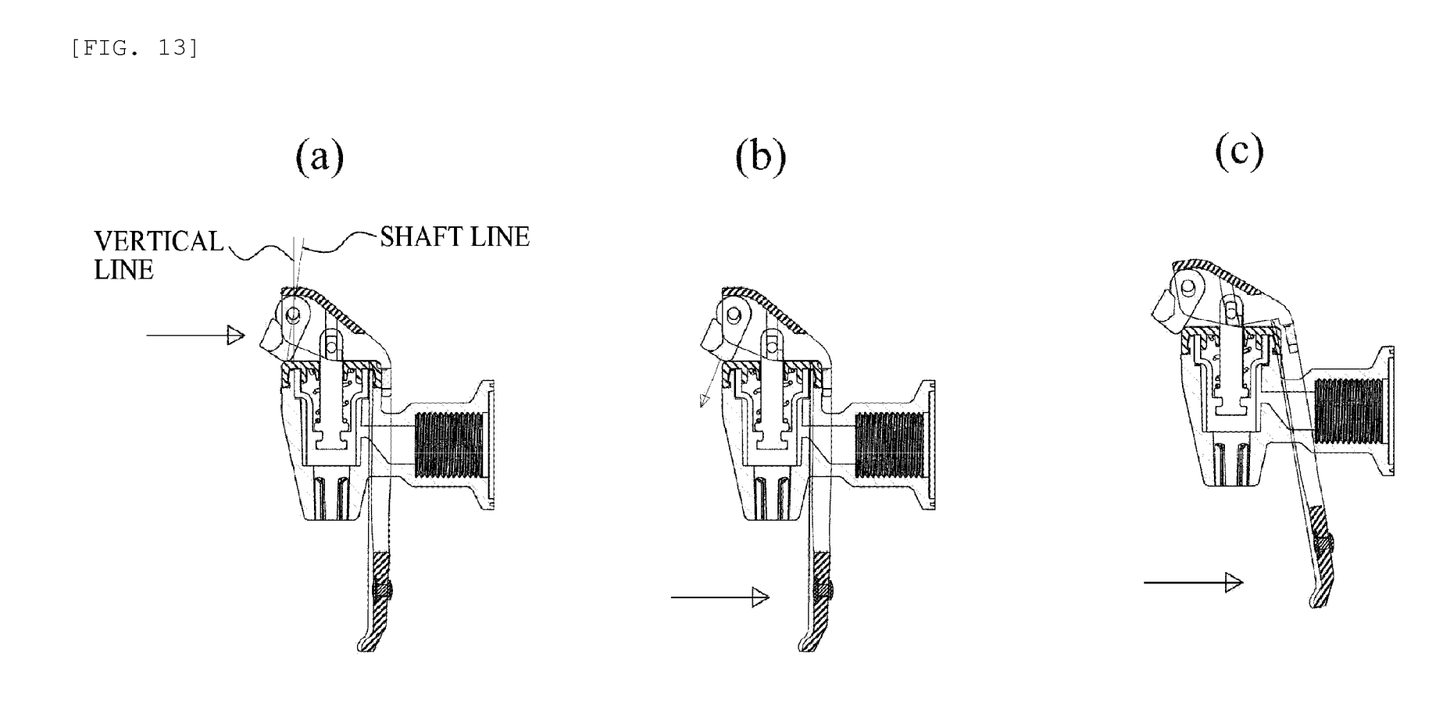
FIG. 13 is a cross-sectional view sequentially showing an angle change state of a safety member when a lever is pressed in a state in which the safety member is not pressed continuously.

FIG. 13 is a cross-sectional view sequentially showing an angle change state of a safety member when a lever is pressed in a state in which the safety member is not pressed continuously.

As shown in FIG. 13, the shaft line is inclined outward in comparison with the vertical line in a state where only the safety member 220 is pressed (FIG. 13a). The angle between the shaft line and the vertical line is determined by the surface where the locking jaw 220c of the safety member 220 meets the upper end of the lever 218.

When the lever 218 is pressed in a state in which the safety member 220 is not pressed continuously, as the shaft line is outward in comparison with the vertical line, the safety member 220 slides from the support point and deviates from the upper surface of the upper cap 216 (FIG. 13b and FIG. 13c). Initially, the lever 218 is pressed while the safety member 220 is being pressed. However, even when the lever 218 is not fully depressed and the safety member 220 is released, the same movement occurs. When the lever 218 is pressed in a state in which the safety member 220 is not pressed, the state shown in FIG. 13c is obtained.

Therefore, since a support point is not formed between the cap contacting part 220b and the upper cap 216, it can not serve as a center point of the lever. As a result, since the operation shaft 208 can not be pulled up, hot water is not discharged.

Further, since the inclined surface is formed so that the lever head is away from the operation shaft 208, the lever 218 can not be rotated forward. Therefore, the operation shaft 208 can not be lifted up and the hot water is not discharged.

If there is no locking jaw 220c of the safety member 220, the shaft line enters more inward than the vertical line, and when the lever 218 is operated in this state, the operation shaft 208 is moved up even when the safety member 220 is not pressed.

In the drawings and detailed description of the present invention, the auxiliary operation hinge hole 218a is formed in the upper end of the lever 218, and the auxiliary operation hinge shaft 220a is formed in the safety member 220. However, contrary to this, a hinge shaft may be formed in the upper end of the lever 218, and a hinge hole may be formed in the safety member 220.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

The invention claimed is:

1. A safety faucet which is provided in a hot water discharge side to selectively close or open a hot water discharge path, the safety faucet comprising:
   a discharge pipe 202 which has the hot water discharge path formed therein;
   a packing 206 which moves up and down inside the discharge pipe 202 to close or open the hot water discharge path;
   an operation shaft 208 which is fixed to the packing 206;
   an upper cap 216 which covers an upper opening of the discharge pipe 202, and has an upper cap through-hole 216a formed in a center thereof to expose an upper end of the operation shaft 208;
   a lever 218 which is rotatably coupled to the upper end of the operation shaft 208, and has an auxiliary operation hinge hole 218a formed in an upper end thereof; and
   a safety member 220 from which an auxiliary operation hinge shaft 220a inserted into the auxiliary operation hinge hole 218a is protruded, and has a cap contacting part 220b formed in a lower end thereof to meet with an upper surface of the upper cap 216 to form a support point,
   wherein the auxiliary operation hinge hole 218a is provided with a vertical space in which the auxiliary operation hinge shaft 220a inserted therein is vertically moved,
   wherein the auxiliary operation hinge shaft 220a is positioned in a lowermost position of the auxiliary operation hinge hole 218a due to gravity upon no force being applied to the safety member 220 so that the cap contacting part 220b is positioned below a virtual plane extending the upper surface of the upper cap 216, and
   wherein the auxiliary operation hinge shaft 220a is positioned in an uppermost position inside the auxiliary operation hinge hole 218a upon the safety member 220 being pushed or pulled up so that the cap contacting part 220b contacts the upper surface of the upper cap and is positioned above the virtual plane extending the upper surface of the upper cap 216,
   wherein the lever comprises a lever head and a pressing part,
      the lever head to which the operation shaft 208 is coupled having an inclined shape in a direction away from the operation shaft 208 while descending downward so that the lever is prevented from rotating forward, and
      the pressing part downwardly extends from the lever head in a longitudinal direction based on the virtual plane extending the upper surface of the upper cap.

2. The safety faucet of claim 1, wherein a locking jaw 220c protrudes from left and right sides of the safety member 220, the safety member 220 rotates around the auxiliary operation hinge shaft 220a when the safety member 220 is pushed so that the locking jaw 220c is in contact with an upper end of the lever 218, and when the lever 218 is pressed while the safety member 220 is pressed, a shaft line connecting the auxiliary operation hinge shaft 220a and the cap contacting part 220b is inclined outward in comparison with a vertical line extending vertically to the upper surface of the upper cap 216, then is identical with the vertical line, and then becomes a state of being inclined more inward than the vertical line.

\* \* \* \* \*